United States Patent
Stratton et al.

(10) Patent No.: US 7,561,598 B2
(45) Date of Patent: Jul. 14, 2009

(54) ADD-ON MODULE FOR SYNCHRONIZING OPERATIONS OF A PLURALITY OF DEVICES

(75) Inventors: John B. Stratton, Santa Rosa, CA (US); Leon K. Werenka, Mukiteo, WA (US); Daniel L. Pleasant, Santa Rosa, CA (US); Gopalakrishnan Kailasam, Santa Rosa, CA (US); Robert T. Cutler, Everett, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 816 days.

(21) Appl. No.: 10/939,867

(22) Filed: Sep. 13, 2004

(65) Prior Publication Data

US 2006/0056459 A1  Mar. 16, 2006

(51) Int. Cl.
  *H04J 3/06* (2006.01)
  *G06F 1/12* (2006.01)
  *G06F 1/14* (2006.01)

(52) U.S. Cl. ............... 370/507; 370/509; 370/339; 709/248; 709/224; 713/375; 713/400; 713/502

(58) Field of Classification Search ............ 370/362, 370/389, 503, 507, 509, 510; 709/224, 248; 713/375, 400, 502
See application file for complete search history.

(56) References Cited

U.S. PATENT DOCUMENTS

| | | | | |
|---|---|---|---|---|
| 5,293,374 A | * | 3/1994 | Eidson | 702/117 |
| 5,566,180 A | * | 10/1996 | Eidson et al. | 370/473 |
| 5,774,377 A | * | 6/1998 | Eidson et al. | 702/187 |
| 5,887,029 A | * | 3/1999 | Husted et al. | 375/224 |
| 5,887,143 A | * | 3/1999 | Saito et al. | 709/248 |
| 5,987,022 A | | 11/1999 | Geiger et al. | |
| 6,006,254 A | | 12/1999 | Waters et al. | |
| 6,161,123 A | | 12/2000 | Renouard et al. | |
| 6,278,710 B1 | * | 8/2001 | Eidson | 370/394 |
| 6,512,990 B1 | * | 1/2003 | Woods et al. | 702/125 |

(Continued)

FOREIGN PATENT DOCUMENTS

EP  1 115 001 A1  7/2001

(Continued)

OTHER PUBLICATIONS

U.S. Appl. No. 10/939,922, Sep. 13, 2004, Daniel L. Pleasant et al.

(Continued)

*Primary Examiner*—Chi H Pham
*Assistant Examiner*—Ahmed Elallam

(57) ABSTRACT

A system and method are provided which add, via an add-on module, synchronization functionality to an instrument that does not otherwise support such synchronization functionality. Various synchronization techniques may be supported by the synchronization module. For instance, in certain embodiments the synchronization module supports message-based synchronization techniques and/or time-based synchronization techniques. Accordingly, in certain embodiments, the add-on module supports synchronization with another device (e.g., another instrument or another add-on module coupled to an instrument) via synchronized local clocks (e.g., IEEE 1588) and messaging over a communication network. In certain embodiments, the add-on module additionally or alternatively supports the use of "time bombs" to trigger scheduled actions on the instrument with which the synchronization module is interfaced.

45 Claims, 6 Drawing Sheets

U.S. PATENT DOCUMENTS

| | | | |
|---|---|---|---|
| 6,611,922 B2 * | 8/2003 | Ozcetin et al. | 713/400 |
| 6,662,217 B1 * | 12/2003 | Godfrey et al. | 709/219 |
| 6,741,952 B2 * | 5/2004 | Eidson | 702/187 |
| 6,745,232 B1 * | 6/2004 | Blech et al. | 709/208 |
| 6,771,594 B1 | 8/2004 | Upadrasta | |
| 6,983,391 B2 * | 1/2006 | Woods et al. | 713/400 |
| 6,983,393 B2 * | 1/2006 | Truchard et al. | 713/500 |
| 6,985,499 B2 * | 1/2006 | Elliot | 370/503 |
| 7,028,204 B2 * | 4/2006 | Jammes et al. | 713/400 |
| 7,054,399 B1 * | 5/2006 | Hildebran et al. | 375/355 |
| 7,058,838 B2 * | 6/2006 | Xu | 713/400 |
| 7,114,091 B2 * | 9/2006 | Vrancic | 713/400 |
| 7,120,121 B2 * | 10/2006 | Sikdar | 370/241 |
| 7,162,510 B2 * | 1/2007 | Jammes | 709/203 |
| 7,324,510 B2 * | 1/2008 | Howe | 370/386 |
| 7,457,868 B1 * | 11/2008 | Guo | 709/224 |
| 2002/0038441 A1 | 3/2002 | Eguchi et al. | |
| 2002/0169844 A1 * | 11/2002 | Jammes et al. | 709/207 |
| 2002/0169993 A1 * | 11/2002 | Woods et al. | 713/400 |
| 2003/0023739 A1 | 1/2003 | Ngoc Vu | |
| 2003/0115501 A1 | 6/2003 | Bamford | |
| 2003/0177154 A1 * | 9/2003 | Vrancic | 708/160 |
| 2004/0028123 A1 * | 2/2004 | Sugar et al. | 375/224 |
| 2004/0039825 A1 | 2/2004 | Bennett | |
| 2005/0041765 A1 * | 2/2005 | Dalakuras et al. | 375/356 |
| 2005/0047339 A1 * | 3/2005 | Dube et al. | 370/230 |
| 2005/0183098 A1 * | 8/2005 | Ilic et al. | 719/328 |
| 2006/0036992 A1 * | 2/2006 | Hayles et al. | 717/104 |

FOREIGN PATENT DOCUMENTS

EP    1 256 858 A2    11/2002

OTHER PUBLICATIONS

U.S. Appl. No. 10/939,838, Sep. 13, 2004, Daniel L. Pleasant et al.
U.S. Appl. No. 10/939,921, Sep. 13, 2004, Daniel L. Pleasant et al.
"SynUTC-An Ultra High Precision IEEE 1588 Compliant Time Synchronisation Technology", Oregano Systems, SynUTC Overview., Oct. 2003.
Search Report dated: Nov. 30, 2005.

* cited by examiner

ADD-ON MODULE FOR SYNCHRONIZING OPERATIONS OF A PLURALITY OF DEVICES

CROSS-REFERENCE TO RELATED APPLICATIONS

This application is related to concurrently filed and commonly assigned U.S. patent applications Ser. No. 10/939,922 entitled "SYSTEM AND METHOD FOR COORDINATING THE ACTIONS OF A PLURALITY OF DEVICES VIA SCHEDULING THE ACTIONS BASED ON SYNCHRONIZED LOCAL CLOCKS". Ser. No. 10/939,838 entitled "SYSTEM AND METHOD FOR SYNCHRONIZING OPERATIONS OF A PLURALITY OF DEVICES VIA MESSAGES OVER A COMMUNICATION NETWORK", and Ser. No. 10/939,921 entitled "SYSTEM AND METHOD FOR ROBUST COMMUNICATION OF STREAMING DATA", the disclosures of which are hereby incorporated herein by reference.

BACKGROUND OF THE INVENTION

Synchronization of the operation of various components of a system is often desired. For instance, in measurement systems that are made up of several traditional all-in-one box instruments, complex measurements often require that several instruments be controlled together in order to properly synchronize their respective operations. As examples, spectrum analyzers should not be allowed to take measurements until signal sources have settled; power meter measurements should not be taken until a sufficient number of samples have been averaged to ensure accuracy; and frequency-sweeping sources should not be allowed to switch to a new frequency until measurements have been completed at the current frequency. Thus, it becomes desirable to synchronize the relative operations of the various instruments.

Often, hardware trigger lines are used to synchronize the various instruments in a test system. Hardware trigger lines are particularly effective in measurement systems where precise synchronization is required, or where measurement speed is important. When implementing hardware trigger lines, the instruments have a trigger output and a trigger input with a dedicated hardware line (e.g., wire) connecting one instrument's trigger output to another instrument's trigger input.

For instance, a spectrum analyzer typically includes a receiver and a digitizer in the same box, wherein the output signal from the receiver should be measured after it has had some period of time in which to settle. When implementing hardware trigger lines between the receiver and the digitizer, the receiver would have a trigger output port that is coupled via a hardware line (e.g., wire) to the digitizer's trigger input port. The voltage on this hardware line goes high at the time that the output signal from the receiver has settled, and the digitizer unit's trigger input senses that voltage transition to high and thus triggers its measurement to begin. Thus, the hardware trigger line ensures that the relative operations of the instruments are synchronized in a desired manner.

The hardware trigger line technique requires a physical wire that goes between these two instruments, and the function of that wire is fixed and dedicated for use as a trigger. Further, inclusion of such hardware trigger lines increases the amount of wiring and thus often results in wiring complexities and/or complications, such as issues concerning routing of the wires and increased difficulty troubleshooting problems. Also, as the length of the hardware trigger line increases (e.g., as the coupled instruments are arranged more distant from each other), the latency of signals communicated over such hardware trigger line also increases.

Another synchronization technique uses software to control the operations of the various instruments in a synchronized manner. Such software synchronization may be used in situations in which hardware triggers are not available, such as when the instruments to be synchronized are arranged too far apart to permit the use of a hardware trigger line. In implementing software for controlling synchronization of the operation of various instruments, the software may utilize predefined time delays, queries of the instruments, and/or software interrupts for coordinating the actions of the instruments. For instance, after instructing a first instruments to take a first action, the software in an external controller may wait for a specific amount of time before instructing another instrument to take a given action that is to be performed after completion of the first action. In some cases, the software in the external controller may query an instrument to determine when it has completed a given function so that the software can determine when it is appropriate to trigger the next action. In certain instances, the instruments may be implemented to send a signal to the external controller to generate a software interrupt in the controller indicating, for example, that a given instrument has completed a certain operation.

As an example of utilizing a software synchronization technique in synchronizing the operations of the above-mentioned receiver and digitizer, a controlling computer may send a message to the receiver instructing it to change frequency. It is known that some amount of wait time is needed before triggering measurement of the signal having the changed frequency (to allow the change in the frequency to settle). So, after instructing the receiver to change its frequency, the controlling computer waits (or "sleeps") for some predefined amount of time, such as 100 milliseconds. The controlling computer then instructs the digitizer to start making a measurement.

Techniques are also known for synchronizing the clocks of networked devices to a high-degree of precision. As one example, Network Time Protocol (NTP) is a protocol that is used to synchronize computer clock times in a network of computers. In common with similar protocols, NTP uses Coordinated Universal Time (UTC) to synchronize computer clock times to within a millisecond, and sometimes to within a fraction of a millisecond. As another example, the Institute of Electrical and Electronics Engineers Standards Association (IEEE-SA) has approved a new standard for maintaining the synchrony between clocks on a network, referred to as the IEEE 1588 "Standard for a Precision Synchronization Protocol for Networked Measurement and Control Systems." In general, this IEEE 1588 standard defines messages that can be used to exchange timing information between networked devices for maintaining their clocks synchronized. The IEEE 1588 standard enables even a greater degree of precision (e.g., to within a microsecond) in clock synchronization than that provided by NTP.

However, while techniques such as NTP and the IEEE 1588 standard provide techniques for synchronizing the clocks of networked devices to a high-degree of precision such that the networked devices that each have a local clock have a common sense of time, these techniques do not address synchronization of the operation of devices. Rather, such techniques focus on actively maintaining synchronized clocks between networked devices. Thus, the active clock synchronization techniques leave open how the devices may leverage their synchronized clocks, if at all, in order to synchronize their respective operations.

BRIEF SUMMARY OF THE INVENTION

The present invention is directed to a system and method which add, via an add-on module, synchronization functionality to an instrument that does not otherwise support such synchronization functionality. Various embodiments are disclosed herein that provide an add-on module that can be interfaced with a pre-existing, legacy device to add synchronization functionality to the legacy device. In certain embodiments, the add-on module supports synchronization with another device (e.g., another instrument or another add-on module coupled to an instrument) via synchronized local clocks (e.g., IEEE 1588) and messaging over a communication network. Many legacy test instruments are not equipped with a local clock, and even if a local clock is included such legacy test instruments often do not support synchronization (e.g., via IEEE 1588) of the local clock with another device's local clock. Further, many legacy test instruments do not include an interface to a communication network. In any case, legacy test instruments do not support the techniques described herein as provided by the add-on module for synchronizing their operation with other instruments.

According to at least one embodiment, a method comprises interfacing a synchronization module with an instrument, wherein the synchronization module provides functionality for synchronizing operation of the instrument with at least one other instrument. The method further comprises triggering, by the synchronization module, at least one action on the instrument to synchronize the performance of the at least one action by the instrument with performance of another action by the at least one other instrument.

Various synchronization techniques may be supported by the synchronization module. For instance, in certain embodiments the synchronization module supports message-based synchronization techniques and/or time-based synchronization techniques. According to one embodiment, a method comprises interfacing a synchronization module with an instrument, and programming the synchronization module to define an action for the instrument to take responsive to a specified event. The method further comprises receiving, by the synchronization module, messages via a communication network from at least one other device with which the synchronization module is temporally synchronized, wherein the messages each identify an event and include a timestamp. The synchronization module determines whether an event identified by a received message is the specified event (for which it was programmed to take the defined action), and if the event identified by a received message is the specified event, then the synchronization module causes the instrument to take the defined action based on the timestamp of the received message.

According to another embodiment, a method comprises receiving, by a synchronization module interfaced with a first of a plurality of devices, a message that includes identification of an action and a detonation time, wherein the synchronization module has a local clock synchronized with a local clock of a second of said plurality of devices and wherein the synchronization module is communicatively coupled with the second of the plurality of devices via a communication network. The method further comprises monitoring, by the synchronization module, its local clock for the occurrence of the detonation time, and upon occurrence of the detonation time, then the synchronization module causes the first device with which it is interfaced to perform the action.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 7 shows an operational flow diagram for synchronizing the operation of devices in accordance with certain embodiments.

DETAILED DESCRIPTION OF THE EMBODIMENTS

Figure 1:
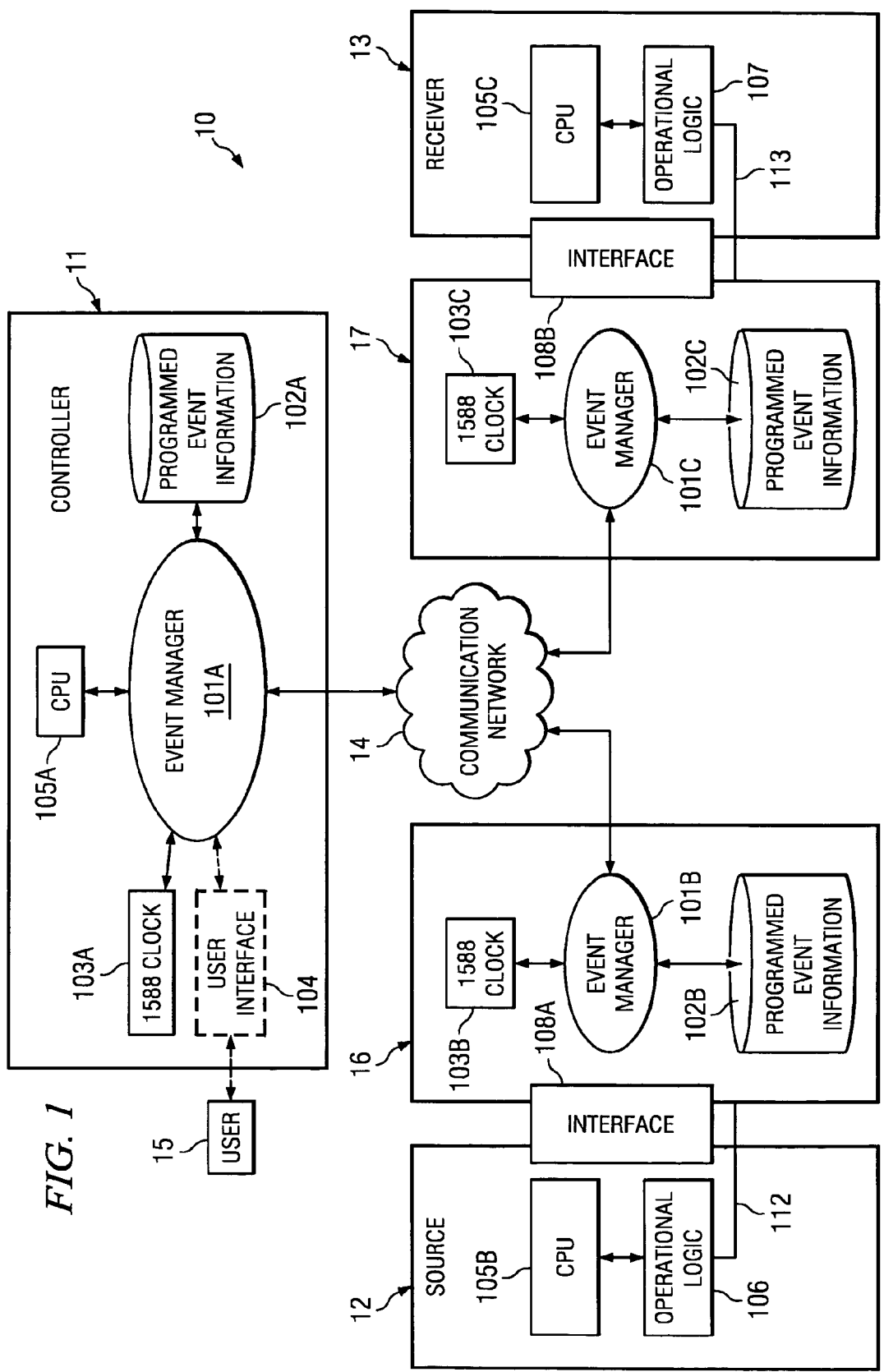
FIG. 1 shows an example system that includes one embodiment of a synchronization module for synchronizing operations of a plurality of networked devices, wherein the synchronization module supports a message-based synchronization technique.

Concurrently filed and commonly assigned U.S. patent application Ser. No. 10/939,838 entitled "SYSTEM AND METHOD FOR SYNCHRONIZING OPERATIONS OF A PLURALITY OF DEVICES VIA MESSAGES OVER A COMMUNICATION NETWORK" discloses various techniques for synchronizing operations of networked devices by using messages communicated between the devices. For instance, a plurality of devices are communicatively coupled via a communication network, and the devices have their local clocks synchronized to a high degree of precision, using IEEE 1588, NTP, or some other technique for synchronizing their local clocks. Event messages can be sent over the network that include an identification of an event, as well as a timestamp that is based on the local clock of the sender. The recipient of an event message can determine if it is configured/programmed to act on the identified event, and if it is to act on the identified event the recipient can take its action based on the timestamp included in the event message. In certain embodiments, the events that are to trigger an action and/or specific responsive actions to be taken for a given event are dynamically programmable for each device. The event messages can be used to coordinate the operations of various devices with a high degree of temporal precision because the actions taken on each device can be based on the timestamp included in the event message.

Concurrently filed and commonly assigned U.S. patent application Ser. No. 10/939,922 entitled "SYSTEM AND METHOD FOR COORDINATING THE ACTIONS OF A PLURALITY OF DEVICES VIA SCHEDULING THE ACTIONS BASED ON SYNCHRONIZED LOCAL CLOCKS" discloses various techniques for synchronizing actions of networked devices via scheduling occurrence of the actions based on synchronized local clocks of the devices. Thus, a plurality of devices are communicatively coupled via a communication network, and the devices have their local clocks synchronized to a high degree of precision, using IEEE 1588, NTP, or some other technique for synchronizing their local clocks. "Time bombs" can be scheduled on the devices to coordinate the occurrence of actions between the devices in accordance with the detonation times set for the respective time bombs. In this regard, the "time bombs" detonate at a programmed time, which may be an absolute time (e.g. 1:00:00) or may be a relative time (e.g., 2 seconds after occurrence of some event), and the detonation of a time bomb triggers a certain action on the respective device. In certain embodiments, not only the detonation time, but also the respective action to be triggered upon detonation is programmable for each device. The time bombs implemented on the various devices can be used to coordinate the operations of the various devices with a high degree of temporal precision. Further, in certain embodiments, the time bombs may be used in combination with event messages, such as those described in U.S. patent application Ser. No. 10/939,838 entitled "SYSTEM AND METHOD FOR SYNCHRONIZING OPERATIONS OF A PLURALITY OF DEVICES VIA MESSAGES OVER A COMMUNICATION NETWORK" for coordinating the respective operations of networked devices.

Various embodiments are disclosed herein that provide an add-on module that can be interfaced with a pre-existing, legacy (or "vintage") device to add synchronization functionality to the legacy device. In certain embodiments, the add-on module supports synchronization with another device (e.g., another instrument or another add-on module coupled to an instrument) via synchronized local clocks (e.g., IEEE 1588) and messaging over a communication network. Many legacy test instruments are not equipped with a local clock, and even if a local clock is included such legacy test instruments often do not support synchronization (e.g., via IEEE 1588) of the local clock with another device's local clock. Further, many legacy test instruments do not include an interface to a communication network. In any case, legacy test instruments do not support the techniques described herein as provided by the add-on module for synchronizing their operation with other instruments.

Test equipment users generally have a large investment in legacy equipment. Test equipment is generally expensive and difficult to replace. If that equipment cannot work in systems that include newer equipment, either the old equipment must be discarded or newer equipment cannot be used with the older equipment. Embodiments of the add-on module described herein enable legacy test equipment to be updated with such modules, thereby enabling the legacy test equipment to synchronize its operations with newer equipment that includes support for the synchronization techniques described herein. Thus, embodiments of the add-on module described herein enable legacy instruments to be upgraded to support the synchronization operations described herein, rather than requiring that the legacy equipment be replaced with newer equipment to gain support of the synchronization operations.

In certain embodiments the add-on module provides the functionality of using event messages for synchronizing operations of networked devices as described in U.S. patent application Ser. No. 10/939,838 entitled "SYSTEM AND METHOD FOR SYNCHRONIZING OPERATIONS OF A PLURALITY OF DEVICES VIA MESSAGES OVER A COMMUNICATION NETWORK" and/or using time bombs for synchronizing operations of networked devices as described in U.S. patent application Ser. No 10/939,922 entitled "SYSTEM AND METHOD FOR COORDINATING THE ACTIONS OF A PLURALITY OF DEVICES VIA SCHEDULING THE ACTIONS BASED ON SYNCHRONIZED LOCAL CLOCKS". Thus, even though a legacy device does not support using event messages and/or time bombs for synchronizing its operation with other devices on a communication network, interfacing the add-on module to such legacy device effectively adds this synchronization capability to the legacy device. In certain embodiments, the legacy device need not even have a network interface or a local clock, as the add-on module provides these features to transform the legacy device into a networked device that can have its operations synchronized with operation of other devices on the network. As further described herein, in certain embodiments the add-on module is programmable to enable the synchronization of the corresponding legacy device with which the add-on module is interfaced to be dynamically changed. For instance, the events for which a responsive action is to be taken, the responsive action(s) to be taken for a given event, the scheduled detonation time of a time bomb, and the action(s) to be taken upon detonation of a time bomb can each be programmed on the add-on module. Thus, enhanced synchronization control can be added to legacy devices, rather than replacing those devices with new ones in order to achieve this synchronization ability.

As described above, measurement systems often require that the operation of several instruments be synchronized (or coordinated) in an appropriate manner to allow for accurate measurements to be obtained. For instance, a spectrum analyzer should be coordinated to make its measurements after a signal source has had sufficient opportunity to settle at its output frequency.

All or a portion of a measurement system may be formed with "synthetic instruments." Synthetic instruments are not able to complete measurements by themselves, but instead a collection of them must work together to implement a measurement. On the other hand, traditional all-in-one box instruments (referred to herein as "fully contained instruments") fully contain all sub-systems needed for making a desired measurement. For instance, a spectrum analyzer may be implemented as a fully contained instrument, or such spectrum analyzer may be formed by a collection of synthetic instruments, such as a receiver, digitizer, etc., that are communicatively coupled via a communication network. A fully contained system may need to interface with some other system in order to have something to measure. For instance, a fully contained spectrum analyzer interfaces with a source to measure the signal provided by the source. Whether using a plurality of fully contained instruments (e.g., spectrum analyzer, RF source, etc.), or a plurality of synthetic instruments (or a combination of fully contained and synthetic instruments), the relative operations of the various instruments is often desired to be coordinated in some manner to allow for accurate measurements.

Within the traditional fully contained instruments, various subsystems can accomplish timing and synchronization functions via hardware trigger lines and/or their underlying firmware. Synthetic instruments, which are functional pieces of the fully contained instruments, may need to be synchronized in some other way because, for example, such synthetic instruments may be arranged too far apart for use of hardware trigger lines to be practical and/or the wiring complexities involved with implementing such hardware trigger lines may render that solution undesirable. Additionally, the requirements for synchronization of synthetic instruments are often more stringent than for synchronization between separate fully contained instruments because of the fact that each synthetic instrument (or "module") contains a smaller set of functionality.

Referring again to the above-mentioned example of a spectrum analyzer, modem fully contained spectrum analyzers typically include a receiver and a digitizer. The spectrum analyzer's firmware controls the frequency sweep of the receiver as well as the digitizer, and it can easily synchronize the digitizer with the receiver frequency to ensure that measurements are taken correctly. A synthetic instrument system, on the other hand, might include a receiver and a digitizer, but not in the same instrument. Synchronization between these devices is therefore not contained within a single instrument. In this synthetic instrument system, synchronization of the digitizer with the receiver frequency is desired to ensure that the digitizer takes measurements at the time that the receiver frequency is settled, and not sooner or later than that. Techniques are provided herein that may be used for synchronizing the operations of a plurality of synthetic instruments and/or fully contained instruments. And, the techniques are implemented via an add-on module that can be interfaced with a legacy synthetic or fully contained instrument to enable this synchronization for such legacy devices that would otherwise not support the synchronization techniques provided herein.

Turning to FIG. 1, an example system 10 is shown according to one embodiment for synchronizing operations of a plurality of networked devices (or "instruments"). The example system 10 includes a controller 11, source 12, and receiver 13. In this example, source 12 and receiver 13 are legacy devices that do not support the synchronization operations described hereafter as being provided by the add-on modules. Accordingly, an add-on module (which is also referred to herein as a "synchronization module") 16 is interfaced with source 12. Likewise, synchronization module 17 is interfaced with receiver 13. In this example, synchronization modules 16 and 17 are communicatively coupled to source 12 and receiver 13 via command interfaces 108A and 108B, respectively. Further, one or more trigger input and/or output lines are coupled between a synchronization module and its associated instrument in this example. For instance, trigger line(s) (e.g., trigger input and/or output lines) 112 are coupled between synchronization module 16 and source 12. Likewise, trigger line(s) 113 are coupled between synchronization module 17 and receiver 13.

Controller 11 and synchronization modules 16 and 17 are all communicatively coupled via a communication network 18, which may be a local area network (LAN), the Internet or other wide area network (WAN), public switched telephony network (PSTN), wireless network, any combination of the foregoing and/or any other network now known or later developed for communicating information from at least one device to at least one other device. Accordingly, in this example, source 12 and receiver 13 need not have an interface to communication network 18, as synchronization modules 16 and 17 provide such interface to communication network 18 for these devices. In alternative embodiments, however, source 12 and/or receiver 13 may have an interface to communication network 18, and the synchronization module 16 and/or 17 need not provide such an interface but may instead interface with its respective device to provide the synchronization capabilities described further herein.

While a source 12 and a receiver 13 are shown in this example, it will be understood that embodiments for synchronizing operations described herein are not limited in application to these exemplary instruments. The techniques described herein may be employed for synchronizing the operations of any instruments that form a measurement system. Such techniques may be employed for synchronizing the operations of synthetic instruments of a measurement system and/or fully contained instruments. Further, while the techniques have particular applicability to measurement systems, in order to synchronize to a high-degree of precision the operations of various instruments that are used for making measurements, the techniques described herein may be likewise employed in other types of systems in which synchronization of operations of a plurality of networked devices is desired.

Controller 11, which may be a personal computer (PC) or other processor-based device, includes a central processing unit (CPU) 105A. Likewise, source 12 includes CPU 105B, and receiver 13 includes CPU 105C. Further, source 12 includes operational logic 106, which is the logic for performing the operations provided by this legacy device. For instance, operational logic 106 may include logic for changing the frequency of a signal (e.g., RF signal) output by the source 12. Such operational logic 106 may include hardware trigger line(s) for triggering the source 12 to take a certain action, such as changing the frequency of its output signal. As described further herein, external trigger lines 112 may be used for triggering the source 12 to take action, such as changing the frequency of its output signal. Similarly, receiver 13 includes operational logic 107, which is the logic for performing the operations provided by this legacy device. For instance, operational logic 107 may include logic for measuring some characteristic (e.g., power, etc.) of the signal output by source 12. Such operational logic 107 may include hardware trigger line(s) for triggering the receiver 13 to take a certain action, such as measuring the output signal of source 12. As described further herein, external trigger lines 113 may be used for triggering the receiver 13 to take action, such as measuring the output signal of source 12.

In this example, controller 11, synchronization module 16, and synchronization module 17 each include a local clock. Each of controller 11 and synchronization modules 16 and 17 have their clocks synchronized in this example. In this specific example, IEEE 1588 is used, wherein controller 11 implements IEEE 1588 clock 103A, synchronization module 16 implements IEEE 1588 clock 103B, and synchronization module 17 implements IEEE 1588 clock 103C. Of course, other techniques for actively synchronizing the local clocks, such as using NTP, may be employed in other implementations. The local clocks are referred to as being "actively synchronized" because the devices interact with each other to maintain their respective local clocks synchronized in accordance with the particular synchronization technique employed (e.g., IEEE 1588 or NTP). Other techniques (e.g., passive techniques) may be employed in alternative embodiments for synchronizing the local clocks, using GPS (global positioning system) receivers, etc. Thus, the controller 11 and synchronization modules 16 and 17 have their local clocks 103A, 103B, and 103C synchronized to a high-degree of precision such that they all have a common sense of time. As described further herein, in certain embodiments controller 11 need not have its local clock synchronized with the clocks of the synchronization modules 16 and 17. Accordingly, in this example, source 12 and receiver 13 need not have local clocks that are synchronized. In alternative embodiments, however, source 12 and/or receiver 13 may implement local clocks that are synchronized (e.g., via IEEE 1588, NTP, GPS, or some other synchronization technique), and the synchronization module 16 and/or 17 need not provide such synchronized local clocks but may instead interface with its respective device to provide the synchronization capabilities described further herein.

Controller 11 and synchronization modules 16 and 17 each have an event manager executing thereon, labeled 101A, 101B, and 101C, respectively. In general, the event manager is software and/or hardware that is designed to allow the various instruments to communicate information about time-sensitive events. Operation of the event manager according to this example embodiment is described further below.

Before proceeding further with the discussion of the example system 10 of FIG. 1, it is helpful to briefly discuss some of the terminology that will be used herein.

The term "event", when used alone, refers to something that happens internally in an instrument, such as within source 12 or within receiver 13 of the example system 10. For example, an event could be generated when the input buffer of a digitizer fills up, or when an output signal has settled. Events are usually generated by the instrument's hardware, although that is not a restriction. Software can generate events also. As described further herein, events can be generated by the synchronization modules for their respective instruments responsive to receipt of an event message and/or detonation of a time bomb as examples.

The term "event message" refers to a message sent on the communication network that is used to notify other instruments (or their associated synchronization module) that an event has occurred. In certain embodiments provided herein, event messages are broadcast using, for example, User Datagram Protocol (UDP), to all of the synchronization modules on a given communication network (e.g., on a given subnet). In other embodiments, the event messages are sent via a point-to-point protocol, such as Transmission Control Protocol (TCP). Any synchronization module can send an event message. Other synchronization modules can either respond to event messages or ignore them.

The term "output event" refers to an event that results in an event message being communicated on the communication network. Note that not all events are output events. An instrument may handle some events internally.

The term "input event" refers to an event that is received from another instrument/synchronization module. The input event arrives in the form of an event message on the communication network.

The term "action" refers to something that an instrument and/or its associated synchronization module does in response to either an event or an event message. In certain embodiments provided herein, actions are executed by means of callback routines. In this context, an action is not an atomic event, e.g., a callback routine can execute a complex sequence of instructions.

The term "programming message" refers to a message sent on the communication network that is used to program a recipient synchronization module to take a certain action (and/or to cause its associated instrument to take a certain action) responsive to detection of a certain event.

In accordance with the embodiments described herein, event messages are sent over the communication network 18 to coordinate the operations of the instruments, such as source 12 and receiver 13. Thus, rather than requiring hardware trigger lines between all of the instruments used in a measurement system, at least certain instruments are synchronized using the message-based technique described herein. According to at least one embodiment, the event messages include identification of an event, as well as a corresponding timestamp. The associated synchronization modules of the instruments can be configured/programmed to take particular action (and/or cause their associated instruments to take a particular action) upon the synchronization module receiving a given event, which may be either an event received by the synchronization module from its associated instrument or an event included in an event message (an "input event"). As further described herein, in certain embodiments the actions are dynamically programmable. For instance, controller 11 may send a programming message to synchronization module 16 instructing its event manager 101B to cause its associated source 12 to take a particular action upon detection by the synchronization module 16 of a specific event. In certain embodiments, synchronization module 16 may be pre-configured to take the desired action responsive to a given event, rather than being dynamically programmed in this manner. Thus, since the synchronization modules are programmed (or otherwise configured) to take appropriate actions responsive to detected events, event messages that identify events and corresponding timestamps (according to the synchronization modules' synchronized local clocks) can be used for coordinating the respective operations of the instruments, as described further herein.

In the example embodiment of FIG. 1, controller 11 and synchronization modules 16 and 17 each include programmed event information, labeled 102A, 102B, and 102C, respectively. Such programmed event information may, for example, specify the action(s) that are to be triggered by the synchronization modules for their respective associated instruments responsive to specified events being detected by the synchronization modules. The programmed event information may, for example, be arranged as a database or stored in any other suitable manner. In certain embodiments, a user interface 104 is provided on controller 11 to enable a user 15 to interact with event manager 101A to, for example, program the event information on the various synchronization modules 16 and 17. Examples of such programmed event information 102A-102C are described further herein, including the specific example provided in Table 2 below.

Because the local clocks of the synchronization modules are synchronized to a high degree of precision, the actions of the various associated instruments can be coordinated with such high degree of precision. While a message-based approach can be used for coordinating the operations of the instruments, their operations can be coordinated with a higher degree of precision than is provided by the messages (e.g., due to latencies that may be encountered in sending the messages over the communication network 18, etc.) because the instruments have their local clocks actively synchronized to a high-degree of precision.

Suppose, for example, that synchronization module 16 is configured/programmed to trigger source 12 to change its output frequency (e.g. RF frequency) in response to synchronization module 16 detecting "Event No. 1", and once the frequency change has settled, then the synchronization module 16 is to output an event message identifying "Event No. 2". Further suppose that synchronization module 17 is configured/programmed to trigger receiver 13 to make a measurement of the signal (e.g., power and/or other characteristics of the signal) in response to synchronization module 17 detecting Event No. 2. User 15 may, in certain implementations, initiate the measurement process by interacting, via user interface 104, with controller 11 to cause an Event No. 1 to be sent to synchronization module 16. As described further herein, such Event No. 1 may, in certain implementations, be broadcast over communication network 18. Event manager 101B of synchronization module 16 would detect the Event No. 1 and, in accordance with the corresponding programmed action identified in the programmed event information 102B for this Event No. 1, would trigger source 12, via trigger line(s) 112, to change its frequency, and thereafter synchronization module 16 would send an event message that identifies Event No. 2 to synchronization module 17. Again, in certain implementations, this event message sent by synchronization module 16 may be broadcast over communication network 18. The event message further includes a timestamp, based on the synchronization module's local clock 103B, corresponding to when the changed frequency settled (and is thus ready for measurement).

Synchronization module 17 receives the event message identifying the Event No. 2 and the corresponding timestamp, and thus synchronization module 17 can trigger receiver 13. via trigger line(s) 113, to perform its programmed action responsive to the Event No. 2 based on the corresponding timestamp in the event message. For instance, synchronization module 17 may be programmed to cause receiver 13 to take the measurement at the timestamp included in the received event message and send that measurement to the controller 11, responsive to synchronization module 17 detecting an Event No. 2. Even though the synchronization module 17 will receive the event message after the timestamp that was included in the event message in this example, if receiver 13 is continuously making measurements and buffering them, the receiver can retrieve from its buffer the measurement that corresponds to the timestamp included in the message and thus synchronization module 17 can retrieve that measurement from the receiver's buffer and send it to the controller 11. Thus, the controller 11 receives the measurement that corresponds to the exact timestamp included in the event message from the synchronization module 16 to synchronization module 17. If the event message from synchronization module 16 to synchronization module 17 was delayed to such an extent that the receiver 13 no longer has in its buffer the measurement corresponding to the timestamp included in the event message, the synchronization module 17 may generate an error, for example.

As another example, synchronization module 17 could be programmed to respond to detection of Event No. 2 by causing receiver 13 to make a measurement at some period of time following the timestamp included in the received event message, such as at 2 seconds following the timestamp included in the received event message, and then synchronization module 17 is to send that measurement to the controller 11. Assuming that the event message can be generated and communicated across the communication network 18 within 2 seconds from the timestamp that is included in the message, the synchronization module 17 can receive this message and cause receiver 13 to make its measurement accordingly (or retrieve the corresponding measurement from the receiver's buffer if it is continuously making measurements). Thus, the synchronization module 17 can cause receiver 13 to take its measurement at a time relative to the timestamp included in the event message received by the synchronization module 17, as opposed to the time that the synchronization module receives the event message. Accordingly, the operations of the source 12 and receiver 13 can be coordinated according to the timestamp included in the event message, and such timestamp is based on the synchronized clock of the sender of the message, i.e., the synchronization module 16 associated with source 12 in the above examples, rather than being limited to synchronizing operations based on the time at which messages are received (which may vary based on network latencies).

Command interfaces 108A and 108B may each be any suitable interface for communicatively coupling the synchronization module to its respective instrument. As examples, command interfaces 108A and 108B may be General Purpose Interface Bus (GPIB), Universal Serial Bus (USB), RS-232, a LAN port, or other communication interface now known or later developed. Command interfaces 108A and 108B may be same type of interface, or they may be different types of interfaces, depending on the interface available for coupling each synchronization module to its respective instrument. Further, multiple types of command interfaces may be available on a single synchronization module, and any of such command interfaces may be selectively used for coupling to an instrument or a plurality of the command interfaces of a synchronization module may be simultaneously used for coupling to a plurality of instruments.

Figure 2:
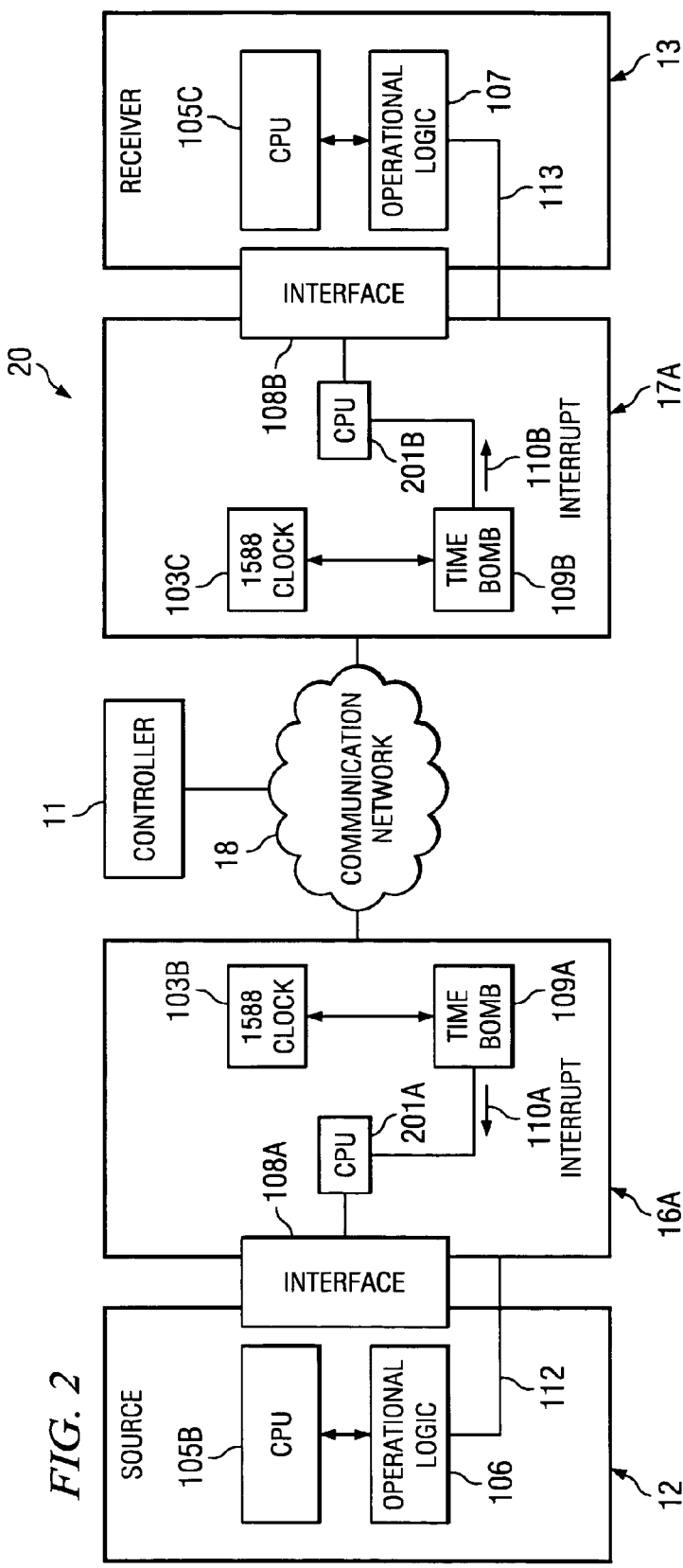
FIG. 2 shows an example system that includes another embodiment of a synchronization module for synchronizing operations of a plurality of networked devices, wherein the synchronization module supports a time-based synchronization technique.
Figure 3:
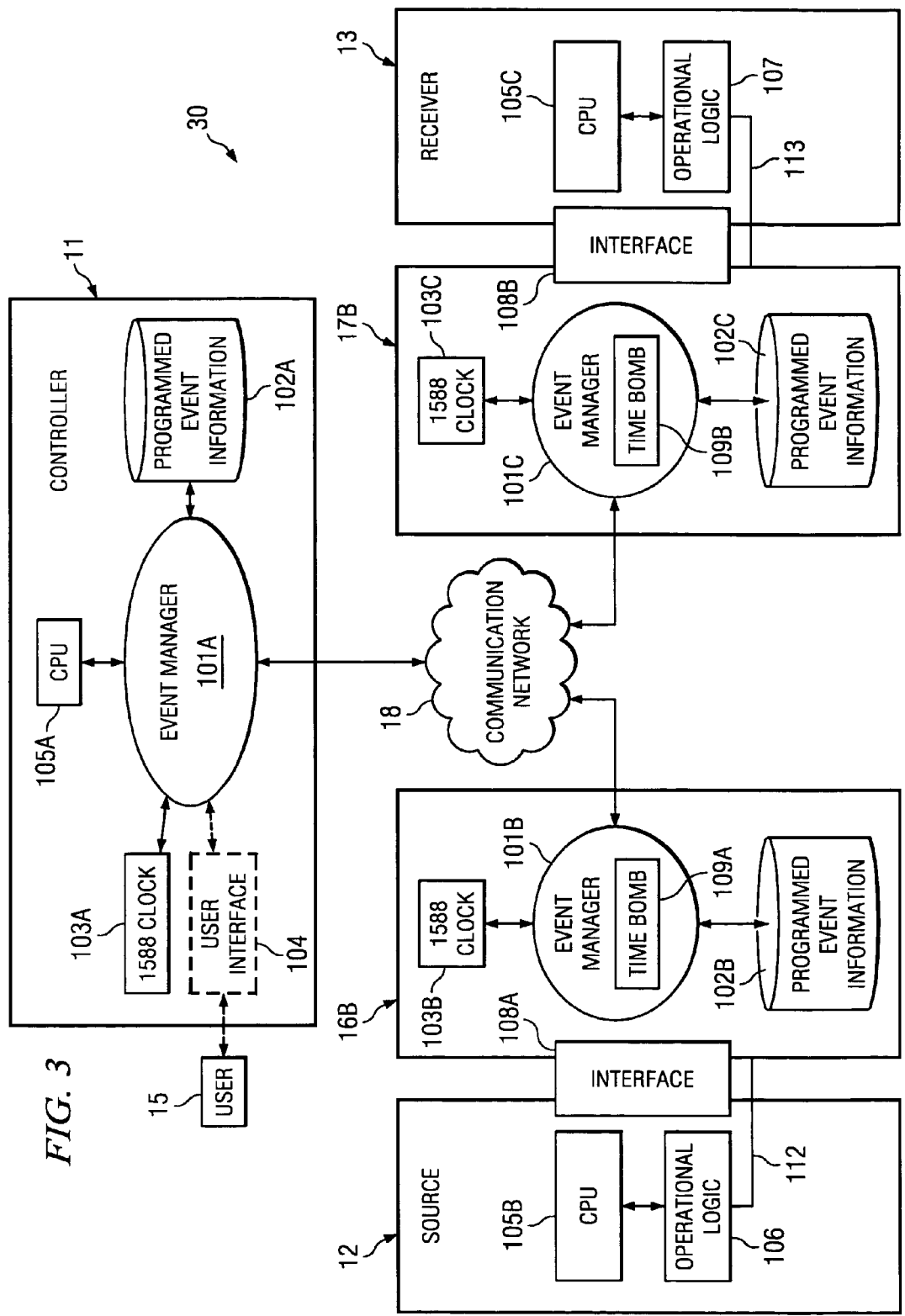
FIG. 3 shows an example measurement system that includes an embodiment of synchronization modules that support both message-based synchronization techniques and time-based synchronization techniques.

While each synchronization module is shown in the example of FIG. 1 (as well as in the examples of FIGS. 2 and 3 discussed below) as being coupled to a single instrument, in certain embodiments a single synchronization module may be implemented for communicatively coupling to a plurality of different instruments for providing synchronization functionality for each of such different instruments. Thus, a single synchronization module may be implemented to control synchronization of a plurality of instruments. The plurality of instruments may, in certain instances be triggered to simultaneously perform the same actions, and in other instances the synchronization module may be programmable for each individual instrument with which it is coupled so that different actions may be performed by the different instruments in a synchronized manner. For instance, if the synchronization module is implemented as a GPIB controller, a plurality of GPIB-based instruments can be coupled to the GPIB bus. This would allow multiple instruments to be controlled by a single synchronization module. Additional trigger line(s) may be included on the synchronization module in this type of implementation, to enable trigger line(s) to be coupled from the synchronization module to each of the instruments. Further, GPIB has a "group execute trigger" command that would also allow multiple instruments to be triggered together, if such operation is desired. Again, while a one-to-one ratio is shown in the examples of FIGS. 1-3 between synchronization modules and their associated instruments, in each of the examples, a synchronization module may be implemented as communicatively coupled to a plurality of instruments for managing the synchronization of such instruments.

In the example of FIG. 1, each synchronization module is operable to receive an event message via communication network 18 and determine if it is programmed to trigger a responsive action on its associated instrument. Thus, each synchronization module is coupled with its associated instrument in a manner that enables the synchronization module to selectively trigger one or more responsive actions on its associated instrument. In some instances, the synchronization module may convert commands received over the communication network 18 into a control structure that is appropriate for its associated instrument, such as Standard Commands for Programmable Instrumentation (SCPI) commands that are transmitted via GPIB, and the synchronization module uses the resulting control structure to trigger its associated instrument to take an appropriate action (e.g., via command interface 108A/108B). Thus, some received event messages may result in the synchronization module generating an appropriate instrument command to input to its associated instrument (e.g., via command interface 108A/108B).

In certain implementations, hardware trigger line(s) (input and/or output) may be coupled between the synchronization module and its associated instrument. For example, trigger line(s) 112 may include output trigger line(s) of the synchronization module 16 coupled to corresponding input trigger(s) of source 12. Accordingly, in response to synchronization module 16 receiving an event message via communication network 18 for which it determines a responsive action should be triggered on source 12 (e.g., to cause source 12 to change its frequency), synchronization module 16 may trigger the responsive action on source 12 by activating the proper output trigger line 112 of the synchronization module. Certain instruments may have an external trigger mode, in which the instruments receive triggers from an external hardware trigger line, such as an external hardware trigger line(s) 112 coupled from a synchronization module. In this case, the synchronization module may send a command via command interface 108A to cause source 12 to go into its external trigger mode, and thus the hardware trigger line(s) 112 coupled from synchronization module 16 to source 12 can be used to trigger actions on source 12 responsive to event messages received by event manager 101B of synchronization module 16.

Further, each synchronization module may be coupled with its associated instrument in a manner that enables the synchronization module to receive events from its associated instrument such that the synchronization module can take one or more responsive actions. For instance, the hardware trigger output line(s) of an instrument may be coupled to the trigger input(s) of its associated synchronization module, thus allowing the synchronization module to detect and respond to instrument events. For example, responsive to source 12 detecting an internal event, its hardware trigger output may be activated (e.g., transition to a high voltage), and because its hardware trigger output is coupled to the synchronization module's trigger input (via trigger lines 112), synchronization module 16 can detect this event and take a responsive action, such as sending an event message over communication network 18 to other instruments.

While synchronization modules are used for both the source 12 and receiver 13 in this example of FIG. 1, in certain embodiments synchronization modules may be used with certain devices (e.g., legacy devices) while other devices (e.g., newer devices) have the functionality of the synchronization module integrated therein. Thus, the synchronization modules may be added to a plurality of various legacy instruments within a measurement system to enable the upgraded synchronization functionality provided thereby between the legacy instruments, and/or the synchronization modules enable their associated legacy instruments to synchronize their operations with newer instruments that support the synchronization operations.

Turning to FIG. 2, an example system 20 is shown according to another embodiment for coordinating operations of a plurality of networked devices (or "instruments"). As with system 10 of FIG. 1, the example system 20 includes a source 12 and receiver 13. As with FIG. 1, source 12 and receiver 13 are legacy devices that include CPU 105B and 105C, respectively, and operational logic 106 and 107, respectively. Accordingly, synchronization modules 16A and 17A are included for providing the below-described synchronization capability to their respective instruments. Synchronization module 16A is interfaced via command interface 108A and trigger line(s) 112 with source 12. Likewise, synchronization module 17A is interfaced via command interface 108B and trigger line(s) 113 with receiver 13. Synchronization modules 16A and 17A are communicatively coupled via communication network 18. Accordingly, in this example, source 12 and receiver 13 need not have an interface to communication network 18, as synchronization modules 16A and 17A provide such interface to communication network 18 for these devices. In alternative embodiments, however, source 12 and/or receiver 13 may have an interface to communication network 18, and the synchronization module 16A and/or 17A need not provide such an interface but may instead interface with its respective device to provide the synchronization capabilities described further below. CPUs 201A and 201B of synchronization modules 16A and 17A are specifically shown in this example. It should be understood that the synchronization modules of other embodiments, such as those of FIG. 1 described above, may likewise include CPUs even though not specifically shown.

Synchronization modules 16A and 17A each include a local clock in this example. Further, synchronization modules 16A and 17A have their clocks synchronized. In this specific example, IEEE 1588 is used, wherein synchronization module 16A implements IEEE 1588 clock 103B, and synchronization module 17A implements IEEE 1588 clock 103C. Of course, other techniques for actively synchronizing the local clocks, such as using NTP, may be employed in other implementations. Alternatively, other techniques (e.g., passive techniques) may be employed in other embodiments for synchronizing the local clocks, using GPS (global positioning system) receivers, etc. Thus, synchronization modules 16A and 17A have their local clocks 103B and 103C synchronized to a high-degree of precision such that they have a common sense of time. Accordingly, in this example, source 12 and receiver 13 need not have local clocks that are synchronized. In alternative embodiments, however, source 12 and/or receiver 13 may implement local clocks that are synchronized (e.g., via IEEE 1588, NTP, GPS, or some other synchronization technique), and the synchronization module 16A and/or 17A need not provide such synchronized local clocks but may instead interface with its respective device to provide the synchronization capabilities described further below.

In the example of FIG. 2, a "time bomb" is implemented on each of synchronization modules 16A and 17A. Specifically, time bomb 109A is implemented on synchronization module 16A associated with source 12, and time bomb 109B is implemented on synchronization module 17A associated with receiver 13. The time bombs allow the synchronization modules to be programmed to take an action(s) (e.g., execute instructions) at pre-defined times, which are referred to as detonation times. The detonation times may be absolute times, such as 1:00:00, or the detonation times may be defined as relative times, such as 10 seconds after the occurrence of a particular event. As an example, time bomb 109A may be programmed on synchronization module 16A, via controller 11, to detonate at 1:00:00 and trigger source 12, via trigger line(s) 112, to change its frequency. Assuming that it is known that it takes 1 second for the frequency to settle at its changed value on source 12, time bomb 109B may be programmed on synchronization module 17A, via controller 11, to detonate at 1:00:01 and trigger receiver 13 to measure a characteristic (e.g., power) of the output signal of source 12. In this regard, the measurement action performed by receiver 13 is coordinated with the changing of frequency by source 12 to ensure that the measurement is taken after the frequency has settled at the changed value. Further, because of the high-degree of precision between the local clocks 103B and 103C, the respective actions of the source and receiver can be scheduled in an efficient manner (e.g., without requiring unnecessarily large amount of time delays between their respective operations).

In this example, the detonation of time bomb 109A on synchronization module 16A generates an interrupt 110A to CPU 201A of synchronization module 16A to cause an appropriate external hardware trigger line 112 to activate (e.g., go high), thereby causing the source 12 to perform the corresponding action (such as change the frequency in the above example). Similarly, the detonation of time bomb 109B on synchronization module 17A generates an interrupt 110B to CPU 201B of synchronization module 17A to cause an appropriate external hardware trigger line 113 to activate (e.g., go high), thereby causing the receiver 13 to perform the corresponding action (such as taking a measurement in the above example). In certain embodiments, the detonation times and the corresponding actions to be taken is programmable.

As mentioned above, certain instruments may have an external trigger mode, in which the instruments receive triggers from an external hardware trigger line, such as an external hardware trigger line(s) 112, coupled from a synchronization module. In this case, the synchronization module 16A may send a command via command interface 108A to cause source 12 to go into its external trigger mode, and thus the hardware trigger line(s) 112 coupled from synchronization module 16A to source 12 can be used to trigger actions on source 12 responsive to event messages received by event manager 101B of synchronization module 16A. Thus, certain actions may be triggered via external hardware trigger lines coupled between the synchronization module and its associated instrument(s). Additionally, in some instances, the synchronization module may trigger action on its associated instrument(s) via the command interface, such as command interface 108A of synchronization module 16A. For instance, responsive to detonation of a time bomb, the synchronization module may send a command that is appropriate for its associated instrument, such as Standard Commands for Programmable Instrumentation (SCPI) commands that are transmitted via GPIB, and the synchronization module uses the resulting control structure to trigger its associated instrument to take an appropriate action (e.g., via command interface 108A/108B).

In view of the above, in certain embodiments (such as that of FIG. 1), synchronization modules are implemented that provide synchronization between their associated instruments based on communication of event messages. In other embodiments (such as that of FIG. 2), synchronization modules are implemented that provide synchronization between their associated instruments based on scheduled actions (i.e., detonation of set time bombs). It should be recognized that in either case the legacy instruments with which the synchronization modules are interfaced do not provide the synchronization capabilities afforded by the synchronization modules. Further, in certain embodiments, the synchronization modules support both message-based synchronization techniques and time-based (or "schedule-based") synchronization techniques.

Turning to FIG. 3, an example measurement system 30 is shown in which synchronization modules 16B and 17B support both message-based synchronization techniques and time-based synchronization techniques. In this example, synchronization module 16B is interfaced with source 12 via command interface 108A and trigger(s) 112, and synchronization module 17B is interfaced with receiver 13 via command interface 108B and trigger(s) 113. Each of synchronization modules 16B and 17B are communicatively coupled via communication network 18, as shown. Further, synchronization module 16B includes IEEE 1588 clock 103B, event manager 101B, and programmed event information 102B, as in the example implementation described above for synchronization module 16 in FIG. 1. Similarly, synchronization module 17B includes IEEE 1588 clock 103C, event manager 101C, and programmed event information 102C, as in the example implementation described above for synchronization module 17 in FIG. 1. Additionally, synchronization modules 16B and 17B implement time bombs 109A and 109B, respectively, such as described above for synchronization modules 16A and 17A in the example of FIG. 2.

Controller 11 is provided, which may be used in the manner described above with FIG. 1 for programming synchronization modules 16B and 17B to trigger certain actions in their associated instruments responsive to detected events (e.g., event messages received by the synchronization modules). Further, controller 11 can be used for programming the time bombs 109A and 109B. As shown, in this example, event manager 101B of source 12 manages the implementation of time bomb 109A, and event manager 101C of receiver 13 manages the implementation of time bomb 109B. For instance, event manager 101A can receive information (e.g., from controller 11) to program the detonation time and corresponding action to trigger upon detonation of time bomb 109A.

Further description is provided in U.S. patent application Ser. No. 10/939,838 entitled "SYSTEM AND METHOD FOR SYNCHRONIZING OPERATIONS OF A PLURALITY OF DEVICES VIA MESSAGES OVER A COMMUNICATION NETWORK" of the functionality of using event messages for synchronizing operations of networked devices, which may be implemented in a synchronization module in accordance with embodiments described herein. Also, further description is provided in U.S. patent application Ser. No. 10/939,922 entitled "SYSTEM AND METHOD FOR COORDINATING THE ACTIONS OF A PLURALITY OF DEVICES VIA SCHEDULING THE ACTIONS BASED ON SYNCHRONIZED LOCAL CLOCKS" of the functionality of using time bombs for synchronizing operations of networked devices, which may be implemented in a synchronization module in accordance with embodiments described herein.

Figure 4A:
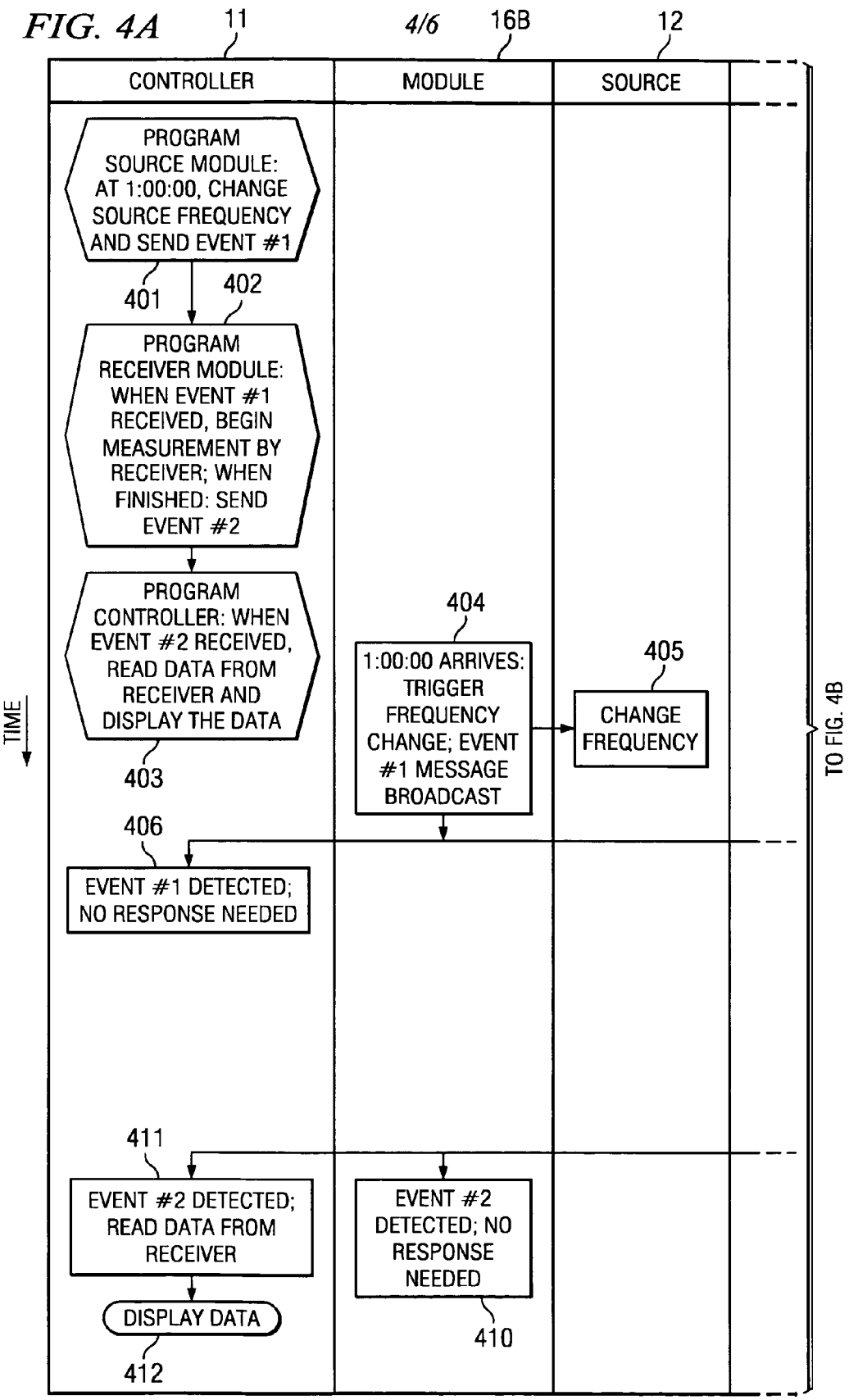
FIGS. 4A-4B show a specific example of using the modules of FIG. 3 for coordinating the operations of their respective instruments.
Figure 4B:
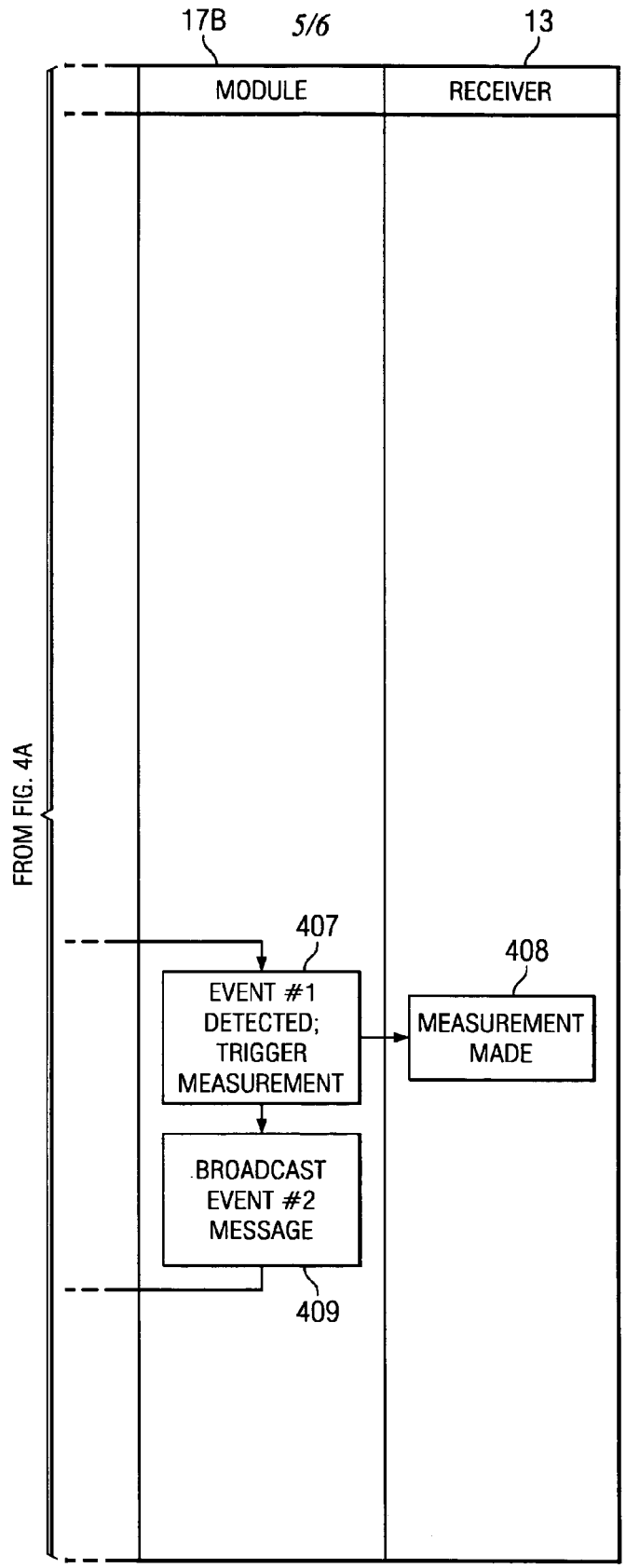

Turning now to FIGS. 4A-4B, a specific example of using synchronization modules 16B and 17B for synchronizing the operations of source 12 and receiver 13 of system 30 (of FIG. 3) is shown. In the example of FIGS. 4A-4B, controller 11 is used to program synchronization module 16B associated with source 12 in operational block 401. For instance, user 15 may interact with user interface 104 to specify certain information according to which synchronization module 16B is to be programmed. In this example, synchronization module 16 is programmed to cause source 12 to change its frequency at 1:00:00 and then broadcast an event message that identifies Event #1. Thus, this information is received (via a programming message) by synchronization module 16 from controller 11 and stored to its programmed event information 102B. As mentioned above, scheduling an event to occur at an absolute time or at some relative time (e.g., a time specified in relation to some other time, such as "10 seconds from the timestamp included in an event message that identified Event X") in this manner may be referred to as setting a "time bomb" (e.g., time bomb 109A) that has an absolute or relative detonation time, wherein upon detonation of such time bomb the synchronization module takes some programmed action (causes source 12 to change its frequency and then send an event message identifying Event #1 in this example). An example of implementing such time bombs and using them for coordinating operations of networked devices is described further in concurrently filed and commonly assigned U.S. patent application Ser. No. 10/939,922 titled "SYSTEM AND METHOD FOR COORDINATING THE ACTIONS OF A PLURALITY OF DEVICES VIA SCHEDULING THE ACTIONS BASED ON SYNCHRONIZED LOCAL CLOCKS", the disclosure of which is incorporated herein by reference.

Controller 11 is used to program synchronization module 17B associated with receiver 13 in operational block 402. For instance, user 15 may interact with user interface 104 to specify certain information according to which synchronization module 17B is to be programmed. In this example, synchronization module 17B is programmed to cause receiver 13 to make a measurement when Event #1 is detected and then broadcast an event message that identifies Event #2. Thus, this information is received by synchronization module 17B from controller 11 and stored to its programmed event information 102C.

Further, in this example, controller 11 itself is programmed, in block 403, to detect certain events and take responsive actions. For instance, user 15 may interact with user interface 104 to specify certain information according to which controller 11 is to be programmed. In this example, controller 11 is programmed to read measurement data from receiver 13 when Event #2 is detected and then display the read data. Thus, this information is received by controller 11 and stored to its programmed event information 102A.

At 1:00:00, the time bomb set on synchronization module 16B detonates (in operational block 404), and in response thereto synchronization module 16B causes source 12 to change it frequency (in operational block 405), and then synchronization module generates an event message that identifies Event #1. As mentioned above, the event message also includes a corresponding timestamp based on the local clock 103B of synchronization module 16B. In this example, synchronization module 16B broadcasts the event message over the communication network 18, using UDP or some other suitable multi-cast protocol. Techniques that may be employed in certain embodiments for using an "unreliable" protocol, such as UDP, in a manner that increases its reliability, such as may be desired when the messages communicated in this manner are relied upon for coordinating operations between networked instruments, are described further in concurrently filed and commonly assigned U.S. patent application Ser. No. 10/939,921 titled "SYSTEM AND METHOD FOR ROBUST COMMUNICATION VIA A NON-RELIABLE PROTOCOL", the disclosure of which is incorporated herein by reference.

Thus, event manager 101B of synchronization module 16B broadcasts an event message that identifies Event #1 and that includes a corresponding timestamp based on the local clock 103B. For instance, the timestamp may be time 1:00:01, which corresponds to the time at which the changed frequency settled. It should be understood that synchronization module 16B could be programmed to send the message at the time that source 12 begins changing its frequency and the timestamp included in the event message may therefore correspond to the time that the source 12 begins the frequency change, in which case the synchronization module 17B may be programmed to cause receiver 13 to take its measurement at some delayed time relative to the included timestamp to allow for the frequency to settle. In this manner, the event message can be in route to synchronization module 17B while the frequency change is occurring on the source 12, which may lead to improved efficiency in the measurement.

The broadcast Event #1 is detected by the event manager 101A of controller 11, and in operational block 406, such event manager 101A of controller 11 determines that no responsive action is needed by controller 11. That is, controller 11 has not been programmed to take any responsive action to a received Event #1, and thus event manager 101A ignores the event message that was broadcast by synchronization module 16B.

Similarly, the broadcast Event #1 is detected by the event manager 101C of synchronization module 17B. Because synchronization module 17B is programmed (see operational block 402) to cause receiver 13 to make a measurement upon receiving Event #1, in operational block 407, event manager 101C of synchronization module 17B causes such responsive action to be taken by receiver 13 (in operational block 408). As discussed above, synchronization module 17B may be programmed to cause receiver 13 to make its measurement at the timestamp included in the event message (wherein the receiver 13 may retrieve a buffered measurement that it made at such timestamp), or synchronization module 17B may be programmed to cause receiver 13 to make its measurement at a programmed time interval from the timestamp included in the event message, as examples.

Just as synchronization module 17B was programmed to do in block 402, in operational block 409, synchronization module 17B broadcasts an event message that identifies Event #2 and that includes a corresponding timestamp based on its local clock 103C. The broadcast Event #2 is detected by the event manager 101B of synchronization module 16B, and in operational block 410, such event manager 101B determines that no responsive action is needed. That is, synchronization module 16B has not been programmed to take any responsive action to a received Event #2, and thus event manager 101B ignores the event message broadcast by synchronization module 17B.

The broadcast Event #2 message is also detected by the event manager 101A of controller 11. Because controller 11 is programmed (see operational block 403) to read the measurement data from receiver 13 and display such data upon receiving Event #2, in operational block 411, event manager 101A of controller 11 causes such responsive action to be taken by controller 11. Thus, controller 11 reads the measurement data from receiver 13. For instance, the measurement data captured by receiver 13 in accordance with the timestamp of the event message that synchronization module 17B received from synchronization module 16B may be stored to a certain memory address in receiver 13, and the controller 11 may read that certain memory address of the receiver in block 411. As another example, the event message generated by synchronization module 17B may include a timestamp at which its measurement was made (e.g., either the same timestamp included in the event message that was sent from synchronization module 16B to synchronization module 17B, or a timestamp that is a certain interval from the timestamp included in the event message that was sent from synchronization module 16B to synchronization module 17B), and controller 11 may query receiver 13 for its measurement corresponding to the timestamp at which such measurement was made in block 411. As still another example, controller 11 may read the measurement taken by receiver 13 from its associated synchronization module 17B. Then, in block 412, controller 11 displays the read measurement data.

In the above example, controller 11 will not receive the event message that identifies Event #2 until some time after the measurement is made by receiver 13, and controller 11 will not read and display such measurement data until an even later time. However, because of the use of the timestamps of the synchronized clocks in the event messages, controller 11 can be assured that it is displaying the appropriate measurement data. For instance, if the receiver 13 made its measurement at 1:00:01, controller 11 can be assured that it is displaying the measurement data that was captured at 1:00:01, event though controller 11 may not receive and display the measurement data until 1:00:05, for example.

Of course, application of the embodiments provided herein for synchronizing the operations of devices is not limited to the specific example of FIG. 2.

As the above example illustrates, the event manager 101A-101C (FIG. 3) is built upon IEEE 1588 functionality for synchronized clocks but it also goes beyond IEEE 1588 by allowing arbitrary asynchronous events to be generated and broadcast to other devices (e.g., other synchronization modules and/or instruments that support such event messages). In certain embodiments, each instrument or its associated synchronization module in a system may be able to broadcast an event message on the network whenever an event happens. The list of events that are actionable on each instrument (or its associated synchronization module) can vary from instrument to instrument, and in some embodiments the actions are programmable on each instrument (or its associated synchronization module). The set of actionable events can thus be defined specifically for to each instrument.

In order to receive event messages in certain embodiments, any synchronization module will be able to "subscribe" to event messages. That is, each synchronization module should be able to listen to event messages that are broadcast by other instruments (or other synchronization modules) and respond to them appropriately (or to ignore them).

A specific implementation of an event manager that may be implemented on a synchronization module is described in further detail below, but embodiments are not intended to be limited to this specific implementation.

In this illustrative implementation, the event manager is in many ways analogous to a network service daemon like an FTP server or a Web server—it waits for inputs and then acts on them. In such implementation, the event manager is a listen-only network server when handling inputs, but its implementation differs for output events. This illustrative implementation of the event manager may be thought of as a collection of threads, although it should not be assumed that the event manager will actually be implemented using a threaded model (this depends on the operating system). The illustrative implementation can be modeled as a collection of threads that are all waiting for some type of input. Each thread goes to sleep until its input buffer has data available.

Input events arrive on the communication network. The event manager simply waits for event messages to arrive, in exactly the fashion that any other network server would. When an event message arrives, the event manager wakes up and examines the data packet. If the data packet contains an Event ID (described further below) that the synchronization module has been programmed to respond to, the event manager calls the corresponding callback routine.

Output events are generated internally by the synchronization module and/or its associated instrument. Often, output events (e.g. time bombs) are the result of hardware interrupts. In this case an interrupt service routine (ISR) is installed for use on the synchronization module. The ISR will be responsible for capturing a time stamp for the event, storing the data, and waking up the event manager, which then executes the appropriate callback routine. The ISR is not the same as the callback routine.

Other events may be handled differently, depending on the hardware/software architecture of the instrument. The event manager allows an arbitrary callback routine to be executed at the time of an event, and that callback routine may handle the event internally within the synchronization module and/or within the associated instrument.

In this example implementation, the event manager relies on multi-cast messages. Multi-casting is usually implemented via the UDP protocol, which is not designed to be a high-reliability service. Packets can (and do) get lost. It is desirable for the event manager to have the ability to detect lost packets; but since event messages are time-critical in most measurement instruments, it is often equally desirable to avoid the overhead that is inherent in hand-shaking protocols like TCP.

The event manager's reliability can be improved through use of one or more of the following techniques:

1. Careful choice of switches. Switches should be chosen that include a high level of store-and-forward capability to minimize packet loss, and that implement Quos functionality so that UDP packets can be give high priority.

2. Redundant broadcast of event messages. Event messages can be broadcast multiple times to ensure that they are received; the receiving synchronization modules can be configured to ignore multiple receptions of the same message. Example techniques that use redundant broadcast of UDP packets for improving reliability are described further in concurrently filed and commonly assigned U.S. patent application Ser. No. 10/939,921 titled "SYSTEM AND METHOD FOR ROBUST COMMUNICATION VIA A NON-RELIABLE PROTOCOL", the disclosure of which is incorporated here by reference.

3. A user-specified timeout for event messages. When a synchronization module "subscribes" to an event, a maximum time delay for that event is specified. When an event message arrives, the time stamp that is contained in the event message is compared with the current time. If the difference is greater than the given maximum, then an error condition occurs. Errors can be broadcast on the communication network or sent to the controlling computer via a TCP connection, as examples.

There are several data types that are used in this illustrative example of an event manager. A first data type is Time. The event manager has two different time-based data types. One for absolute time (TimeStamp), and another for time intervals (TimeInterval).

Another data type is Function ID ("FID"). The FID is a value (e.g., a 16-bit integer) that represents some internal functionality of an instrument. It may be implemented as an instrument-specific number that is used to identify various functions that are intrinsic to the instrument with which a synchronization module is associated.

Instrument functions are classified as "inputs" or "outputs". In this nomenclature, an "output" function is something that happens internally on the instrument and thereby causes an event message to be sent to other instruments. An "input" function is one that the instrument can execute in response to an event message being received by the associated synchronization module. A time bomb is a special version of an output function for which specific API operations exist (e.g., to set the detonation time). These functions correspond closely of the definitions of "input events" and "output events". Strictly speaking, an "input event" is an event that would result in the execution of an "input function".

In this example implementation, every synchronization module has a table of FID values and their descriptions for the associated instrument, as in the example provided in table 1 below:

TABLE 1

| | Description |
|---|---|
| Output FID Values | |
| 001 | Source settled |
| 002 | Event 1 out |
| 003 | Event 2 out |
| 004 | Trigger out |
| 005 | Time bomb 1 |
| 006 | Time bomb 2 |
| 007 | Time bomb 3 |
| Input FID Values | |
| 0080 | Step Frequency by 1 MHz |
| 009 | Patt Trig In |

It should be noted that some of these functions can also have a corresponding hardware trigger (either a trigger input or a trigger output).

In certain embodiments, a user can programmatically extend the Function ID table for a given instrument. When it is desired that the synchronization module be programmed to cause its associated instrument to respond to an external event, for example, a new function can be added to the table.

Another data type is Event ID ("EID"). The EID is a user-defined value (e.g., a 16-bit integer) that is included in a broadcast event message to identify an event. On input of an event message, a synchronization module will read the EID to determine if it should respond to it or not (e.g., to determine whether the identified event is one which the synchronization module has been configured/programmed to take some responsive action). On output, the synchronization module will add the EID to the event message packet so that other devices can identify the source of the event. In general, this allows the user to define EID values that are used with FID values.

A Function ID to Event ID map is provided in this example implementation. That is, the event manager in each synchronization module maintains a FID to EID map. This may be implemented as a table, for example. This table maintains the mapping between EIDs and FIDs, and also includes other data, such as:

(a) A flag for disabling/enabling each function.

(b) The (address of) the callback function that is used for the event.

(c) Information as to whether or not the event in question is an input or an output. While time bombs are output events, they may be flagged specially in the table because they have specific API functions associated with them.

(d) A timeout value. This is used for input events and represents the maximum delay that can be tolerated before an event message is received.

An example of such a table that may be implemented in a synchronization module is provided in Table 2 below.

TABLE 2

| Function ID | Description | Event ID | Enable/ Disable | Input/ Output/ Time Bomb | Call-back function | Timeout |
|---|---|---|---|---|---|---|
| 001 | Source settled | 23012 | Y | Output | Xxx | N/A |
| 002 | Event 1 out | 23013 | Y | Output | Yyy | N/A |
| 003 | Event 2 out | 23014 | N | Output | Zzz | N/A |
| 004 | Time Bomb | 23015 | N | Time Bomb | . . . | N/A |
| 101 | Trigger In | 55013 | Y | Input | . . . | 123.456 |
| 101 | Alt. Trigger | 55014 | Y | Input | . . . | 12.3456 |
| 102 | Dump data | 66013 | N | Input | . . . | 1.23456 |
| 103 | Shutdown | 66014 | N | Input | . . . | 12.3456 |
| 104 | Use programmed | 66015 | N | Input | . . . | 123.456 |

A given FID in the table represents either an input or an output, but not both. A time bomb is a special type of output function. Table 2 provides an example of information that may be stored to the programmed event information 102B of synchronization module 16B (FIG. 3). The programmed event information 102A and 102C of controller 11 and synchronization module 17B may be arranged similarly.

The enable/disable setting of Table 2 reduces unnecessary traffic over the communication network for output events, and is used to identify relevant event messages for input events. It is possible to specify (and enable) multiple EIDs for a given FID. This enables the event manager to execute the same function if any of the EIDs is received.

Another data type is Event Message Data. According to this illustrative implementation, event messages are of a simple data format and include the following information:

1. Event ID
2. Time stamp
3. Number of bytes to follow
4. Event-specific data

Event messages are sent using the SendEvent( ) call. Usually, this routine is called from within user callback routines. The data that is sent with the event is preferably minimal to avoid/minimize network latency issues.

Various API functions are provided in this illustrative implementation. One API function is Reset( ). This function resets the event manager to its default (factory) state. All functions will be disabled. Pending time bombs and event messages will be cancelled. User-defined events will be deleted.

Another API function is GetCurrentTime( ). This function returns the current value of the IEEE 1588 clock.

Another API function is CreateInputFn (FID). This function creates a new input function with the given FID. The function is created with no EIDs or callbacks, and it is marked as an input function (not an output function or a time bomb). It returns an error and does nothing if the given FID is already in use, or if there is not enough memory to expand the function table.

Another API function is DestroyInputfn (FID). This function removes the given function from the function table. It returns an error and does nothing if the given FID does not exist.

Another API function that is provided is SetCallBackFn (FID, CallBackFn, Cancel CallBackFn, ErrorCallBackFn, PtrTo VendorData). This function sets the callback function for any FID value. The 'CallBackFn' is called when an event occurs. For output events, the callback function will usually format an event message and broadcast it on the communication network, although the event manager does not restrict the functionality of the callback. For input events, the callback function will be called when an event message is received that maps to the given function.

The 'CancelCallBackFn' is called whenever the function is disabled. If the function is already disabled, this callback will not be executed. The 'Error CallBackFn' is called for any warning or errors. For example if a time adjustment happens, that may force some time bombs to be ignored and will raise a warning/error. The types of errors that will cause this routine to be called will generally be instrument-specific. The SetCallBackFN does nothing and returns an error if a user tries to assign callbacks to an FID that does not exist.

In this example implementation, callback functions are passed the following parameters:
  Function ID
  Event ID
  Time Stamp
  Vendor-specific Data To avoid any unnecessary function calls, any of the callback functions can be null.

Another API function that is provided is SetTimeout(FID, MaxYTimeDelay). This function sets the maximum time delay that can be tolerated before an event message is received. If a received event was delayed by more than MaxTimeDelay, then an error condition will occur. This function does nothing and returns an error if the given function is not an input function.

MapFIDtoEID(FID, EID) is another API function that is provided. This function maps a given FID to an EID. This function does nothing and returns an error if a user tried to map from an FID that does not exist.

UnMapFIDtoEID(FID, EID) is an API function that unmaps a given FID from an EID. This returns the mapping to the default state and also disables the event (see EnableEvent below). This functionality is similar to the EnableEvent call (below), but it is used in cases where multiple EIDs are mapped into a single FID and only one of the EIDs is to be unmapped. This function does nothing and returns an error if the given FID/EID pair cannot be found.

EnableEvent(FID, EID, true/false) is an API function that enables or disables an event using FID or EID or both. If the function is an input, it subscribes/unsubscribes to all occurrences of it; and if the function is an output, it enables/disables all occurrences of the output. If a zero is specified for either FID or EID, the parameter will be ignored and the other (presumably non-zero) parameter will be used.

If the given FID refers to a time bomb, the function is to be enabled by this function and initialized by a CreateTimeBomb( ) function (see below). This function EnableEvent can be used to disable a time bomb, in which case it does the same thing as the CancelTimeBomb( ) call. This EnableEvent function does nothing and returns an error if the FID/EID pair cannot be found.

SendEvent(EID, TimeStamp, Data, Bytes) is another API function that is provided. This function broadcasts an event message. It is intended to be called from within callback routines, and shouldn't be called if the function is disabled, although this will not cause an error.

CreateTimeBomb(FID, TimeStamp, RepeatCount, TimeInterval) is another API function that is provided. This function will set a repeated time bomb that will start from the given time stamp, then it will repeat for RepeatCount-1 times using the given time interval (so the total number of detonations is RepeatCount). The RepeatCount can be set to −1 for infinite looping. Every time the time bomb expires the CallBackFn is called for execution.

CreateTimeBomb(FID, TimeStamp, Frequency) is another function, which is a special version of the above function. This function creates a repeated time bomb with repeat_count=−1. The time interval is calculated from the frequency parameter.

Another API function provided is CancelTimeBomb(FID). This function will try to cancel a time bomb. There is no guarantee that the time bomb will be cancelled before it fires. In some cases the CallbackFn may handle this with internal flags. This CancelTimeBomb function does the same thing as EnableEvent( ) when EnableEvent( ) is used to disable a time bomb function. The CancelTimeBomb function returns an error and does nothing if the given FID does not have any time bombs set, or if the FID is not a time bomb to begin with.

GetFunctionMap( ) is a function that will return the information that is contained in the FID-to-EID map (defined above). This function may be used for debugging purposes, for example.

The event manager includes a network daemon that listens for commands on the communication network and makes appropriate API calls. This functionality enables a (remote) host computer to program a synchronization module for measurement-specific tasks. The controlling computer may, for instance, program a synchronization module to cause its associated instrument to start a measurement when a certain event message is received by the synchronization module. To do that, the host computer sends a programming command to the synchronization module.

As described above, the event manager also listens for broadcast event messages from other devices (e.g., other synchronization modules and/or instruments). This means that the event manager of this example implementation includes two network listeners: one to listen for event messages from other devices (which listens on a multicast UDP port), and one to listen for remote programming commands (which listens on a TCP port).

The network daemon simply listens on a TCP port for commands. Each command may be accompanied by additional data. Note that the allowed commands correspond to the API functions that are described above.

While an illustrative implementation of an event manager is described in detail above, embodiments are not limited to that example implementation. Rather, various features and implementation details provided above may be changed in alternative embodiments. For example, in certain embodiments TCP may be used for sending event messages, rather than broadcasting event messages via UDP. Also, the various example API functions provided in the example event manager described above may change, all or some of such functions may not be provided, and/or additional functions may be provided in alternative event manager implementations.

Figure 5:
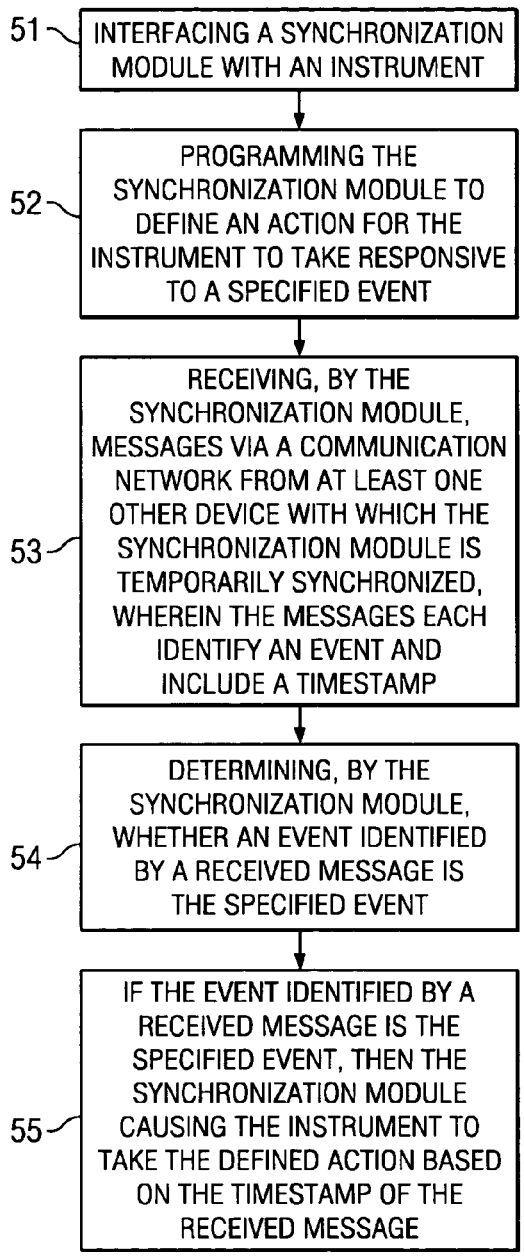
FIG. 5 shows an operational flow diagram for synchronizing the operation of a plurality of networked devices according to one embodiment.

Turning to FIG. 5, an operational flow diagram for synchronizing the operation of a plurality of networked devices according to one embodiment is shown. In this example, a synchronization module is associated with an instrument and synchronizes the instrument's operation with operation of other devices responsive to event messages. In operational block 51, a synchronization module is interfaced with an instrument. In operational block 52, the synchronization module is programmed to define an action for the instrument to take responsive to a specified event. For instance, synchronization module 16 is associated with source 12, in the example of FIG. 1, and such synchronization module 16 may be programmed to cause source 12 to change its frequency (the defined action) responsive to the synchronization module 16 receiving an event message that identifies an Event #1 (the specified event). In operational block 53, the synchronization module receives messages via a communication network from at least one other device with which the synchronization module is temporally synchronized, wherein the messages each identify an event and include a timestamp. The at least one other device with which the synchronization module is temporally synchronized in this instance may be another synchronization module that is associated with another instrument, or it may be another instrument that supports this synchronization and use of event messages.

In operational block 54, the synchronization module determines whether an event identified by a received message is the specified event. And, in block 55, if the event identified by the received message is the specified event, then the synchronization module causes its associated instrument to take the defined action based on the timestamp of the received message.

Figure 6:
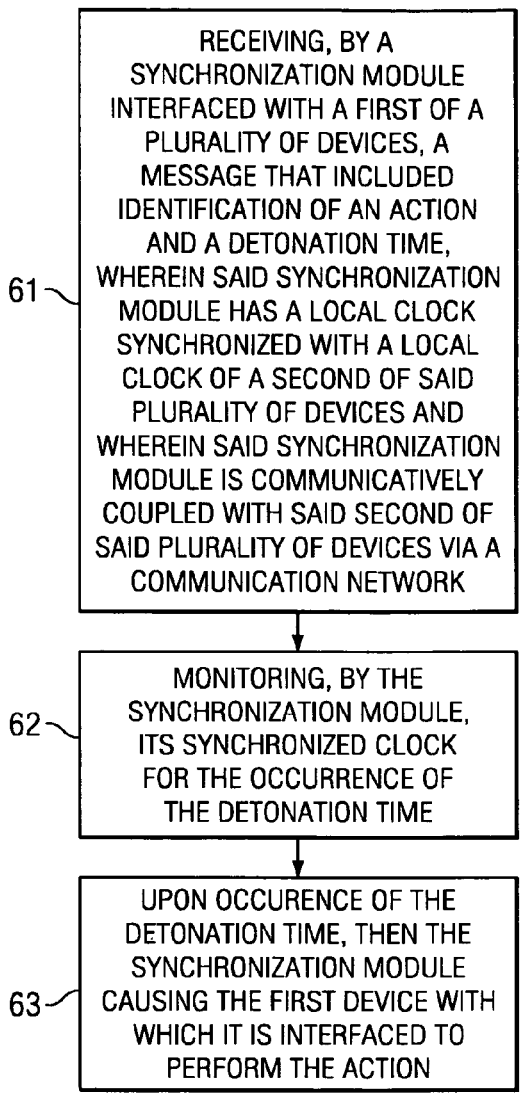
FIG. 6 shows an operational flow diagram for synchronizing the operation of a plurality of networked devices according to another embodiment.

Turning to FIG. 6, an operational flow diagram for synchronizing the operation of a plurality of networked devices according to another embodiment is shown. In this example, a synchronization module is associated with an instrument and synchronizes the instrument's operation via a time-based technique. In operational block 61, a message is received by a synchronization module that is interfaced with a first of a plurality of devices, wherein the message includes identification of an action and a detonation time. The message may be received, for example, from a controller (such as controller 11). The action identified in the message may be a plurality of actions. The detonation time may be an absolute time or a relative time. The synchronization module has a local clock synchronized with a local clock of a second of the plurality of devices, and the synchronization module is communicatively coupled to the second device via a communication network. As described above, the local clocks may be synchronized to a high-degree of precision using a synchronization technique, such as IEEE 1588, NTP, or GPS, as examples.

In operational block 62, the synchronization module monitors its synchronized clock for the occurrence of the detonation time. According to various embodiments, the monitoring of the synchronized clock for the occurrence of a detonation time may be performed by hardware logic and/or software logic. For instance, in one implementation, upon the event manager receiving a message that sets a detonation time for a time bomb, the event manager stores the detonation time in a hardware register. Hardware logic is included that compares the detonation time in the hardware register with the current time of the IEEE 1588 local clock, and when the local clock's time equals the detonation time, it generates an interrupt. The interrupt service routine (ISR) will cause the event manager to trigger the corresponding action that is to be taken by the associated instrument upon detonation of the time bomb. Alternatively, the 1588 local clock could be implemented to generate an interrupt on each clock cycle, and the event manager may compare the current time of the local clock with the received detonation time. However, this alternative technique of using the software to monitor the local clock for the received detonation time is not as efficient as monitoring the clock for the detonation time in the hardware logic.

Upon occurrence of the detonation time, the synchronization module causes the first device to perform the action in operational block 63. Thus, as described above, the desired action can be programmed to occur on the first device at a desired time (either absolute time or relative time), and because the synchronization module has its clock synchronized with the second device, the action can be programmed to occur on the first device at a desired coordination relative to occurrence of action(s) on the second device.

Another example operational flow diagram according to certain embodiments is shown in FIG. 7. In operational block 71, a synchronization module is interfaced with an instrument, wherein the synchronization module provides functionality for synchronizing operation of said instrument with at least one other instrument. As described above, the synchronization module may provide message-based and/or time-based synchronization functionality, as examples. In operational block 72, the synchronization module triggers at least one action on the associated instrument to synchronize the performance such at least one action with performance of another action by at least one other instrument. As examples, the synchronization module may trigger an action on its associated instrument responsive to the synchronization module receiving a particular event message via a communication network and/or responsive to a time bomb detonating on the synchronization module.

In view of the above, various embodiments of synchronization modules are provided that can be interfaced to legacy devices to provide support for synchronization operations, such as message-based and/or time-based synchronization, which the legacy devices would not otherwise support.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system comprising:
 a synchronization module communicatively coupled to a first of at least two devices through a command interface, wherein the synchronization module includes:
  means for synchronizing its clock with at least a second of the at least two devices;
  means for receiving, via a communication network, a first message that includes a timestamp and identifies an event; and
  means for determining a responsive action to cause the first of said at least two devices to take in response to the identified event, wherein a determined action is taken based on the timestamp included in the first message;
 wherein said at least two devices are external to said synchronization module, and wherein said first device is a legacy device that does not include a synchronization functionality, the legacy device including a central processing unit and operational logic.

2. The system of claim 1 wherein the means for synchronizing comprises:
means for implementing IEEE 1588 standard.

3. The system of claim 1 wherein said means for synchronizing comprises;
means for actively synchronizing said clock of said synchronization module with a clock of said at least a second of the at least two devices by interacting with said at least a second of the at least two devices.

4. The system of claim 1 wherein said timestamp is based on the clock of a device sending the first message, and wherein said clock of said synchronization module is synchronized with the clock of the sending device.

5. The system of claim 1 wherein said synchronization module further comprises:
means for communicating a second message to the second of the at least two devices.

6. The system of claim 5 wherein said means for communicating comprises:
means for broadcasting said second message via said communication network.

7. The system of claim 6 wherein said means for broadcasting sends said second message via User Datagram Protocol (UDP).

8. The system of claim 1 wherein said means for receiving the first message comprises:
means for receiving a broadcast message over said communication network.

9. The system of claim 1 wherein the synchronization module is programmable as to the responsive action to take in response to the identified event.

10. The system of claim 1 wherein the at least two devices are instruments in a measurement system.

11. The system of claim 10 wherein the at least two devices must be operated in a synchronized or coordinated manner in order to complete a measurement.

12. The system of claim 1 wherein the second of the at least two devices comprises a synchronization module coupled to an instrument.

13. A synchronization module comprising:
a command interface for communicatively coupling to a first of at least two devices;
a local clock that is in synchronization with a clock of at least a second of the at least two devices; and
an event manager that is operable to receive messages via a communication network, wherein the messages include information identifying an event and a timestamp, and wherein the event manager is configured to determine whether to trigger an action by the first device with which the synchronization module is coupled responsive to an identified event in a received message;
wherein said at least two devices are external to said synchronization module, and wherein said first device is a legacy device that does not include a synchronization functionality, the legacy device including a central processing unit and operational logic.

14. The synchronization module of claim 13 wherein if an action is determined to be triggered, such action is triggered based on the timestamp included in the received message.

15. The synchronization module of claim 14 wherein the action is triggered at the timestamp included in the received message.

16. The synchronization module of claim 14 wherein the action is triggered at a defined time relative to the timestamp in the received message.

17. The synchronization module of claim 13 wherein the synchronization module and the at least a second of the at least two devices actively synchronize their clocks by interacting with each other.

18. The synchronization module of claim 13 wherein at least a portion of said messages is sent by said at least a second of the at least two devices, and wherein said timestamp is based on the clock of said at least a second of the at least two devices.

19. The synchronization module of claim 13 wherein the event manager is operable to broadcast a message over said communication network responsive to an identified event.

20. The synchronization module of claim 13 wherein the event manager is programmable as to the action to trigger in response to the identified event.

21. A synchronization module comprising:
a command interface for communicatively coupling with an instrument; and
an event manager that is configured to trigger at least one action on said instrument to synchronize the performance of said at least one action with performance of another action by at least one other instrument;
wherein said instrument and said at least one other instrument are external to said synchronization module, and wherein said instrument is a legacy device that does not include a synchronization functionality, the legacy device including a central processing unit and operational logic.

22. The synchronization module of claim 21 wherein the event manager is operable to trigger said at least one action on said instrument responsive to a message received via a communication network.

23. The synchronization module of claim 22 wherein said message includes identification of an event and a timestamp.

24. The synchronization module of claim 23 wherein said event manager is programmable as to the at least one action to trigger responsive to a specified event.

25. The synchronization module of claim 23 wherein said event manager triggers said at least one action based on the timestamp included in said message.

26. The synchronization module of claim 21 wherein the event manager is operable to trigger said at least one action on said instrument responsive to a scheduled time occurring.

27. The synchronization module of claim 26 wherein the event manager is programmable as to the scheduled time and the at least one action to trigger at said scheduled time.

28. A method for upgrading a legacy instrument, said method comprising:
interfacing a synchronization module with said legacy instrument through a command interface, wherein said synchronization module provides functionality for synchronizing operation of said legacy instrument with at least one other instrument; and
triggering, by said synchronization module, at least one action on said legacy instrument to synchronize the performance of said at least one action by said instrument with performance of another action by said at least one other instrument;
wherein said legacy instrument and said at least one other instrument are external to said synchronization module, and wherein said legacy instrument does not include a synchronization functionality, the legacy instrument including a central processing unit and operational logic.

29. The method of claim 28 wherein said triggering comprises:
activating a trigger line coupled from said synchronization module to said legacy instrument.

30. The method of claim 28 wherein said triggering comprises:
sending a command from said synchronization module to said legacy instrument.

31. The method of claim 28 wherein said triggering comprises:
triggering the at least one action on said legacy instrument responsive to a message received via a communication network.

32. The method of claim 31 wherein said message includes identification of an event and a timestamp.

33. The method of claim 32 further comprising:
said synchronization module receiving a programming message that programs the event manager as to the at least one action to trigger responsive to a specified event.

34. The method of claim 32 wherein said triggering further comprises:
triggering said at least one action on said timestamp included in said message.

35. The method of claim 28 wherein said triggering comprises:
triggering said at least one action on said instrument responsive to a scheduled time occurring.

36. The method of claim 35 further comprising:
said synchronization module receiving a programming message that programs the event manager as to the scheduled time and the at least one action to trigger at said scheduled time.

37. A method for upgrading a legacy instrument, said method comprising:
interfacing a synchronization module with said legacy instrument through a command interface;
programming the synchronization module to define an action for the instrument to take responsive to a specified event;
receiving, by the synchronization module, messages via a communication network from at least one other device with which the synchronization module is temporally synchronized, wherein the messages each identify an event and include a time stamp;
determining, by the synchronization module, whether an event identified by a received message is the specified event; and
if the event identified by a received message is the specified event, then the synchronization module causing the instrument to take the defined action based on the timestamp of the received message;
wherein said legacy instrument and said at least one other device are external to said synchronization module, and wherein said legacy instrument device does not include a synchronization functionality, the legacy instrument including a central processing unit and operational logic.

38. The method of claim 37 wherein causing the instrument to take the defined action based on the timestamp of the received message comprises:
causing the instrument to take the defined action at the timestamp of the received message.

39. The method of claim 37 wherein causing the instrument to take the defined action based on the timestamp of the received message comprises:
causing the instrument to take the defined action at a defined time relative to the timestamp of the received message.

40. The method of claim 37 wherein said at least one other device comprises a synchronization module interfaced with another instrument.

41. A method for upgrading a first of a plurality of devices, said method comprising:
receiving, by a synchronization module interfaced with said first of said plurality of devices through a first command interface, a message that includes identification of an action and a detonation time, wherein said synchronization module has a local clock synchronized with a local clock of a second of said plurality of devices and wherein said synchronization module is communicatively coupled with said second of said plurality of devices via a communication network;
monitoring, by the synchronization module, its local clock for the occurrence of the detonation time; and
upon occurrence of the detonation time, then the synchronization module causing the first device with which it is interfaced to perform the action;
wherein said plurality of devices is external to said synchronization module, and wherein first device is a legacy device that does not include a synchronization functionality, the legacy device including a central processing unit and operational logic.

42. The method of claim 41 wherein said action comprises taking a measurement.

43. The method of claim 41 wherein said synchronization clocks are synchronized using one selected from the group consisting of: IEEE 1588 and Network Time Protocol (NTP).

44. The method of claim 41 wherein said detonation time comprises an absolute time.

45. The method of claim 41 wherein said detonation time comprises a relative time.

* * * * *